UNITED STATES PATENT OFFICE.

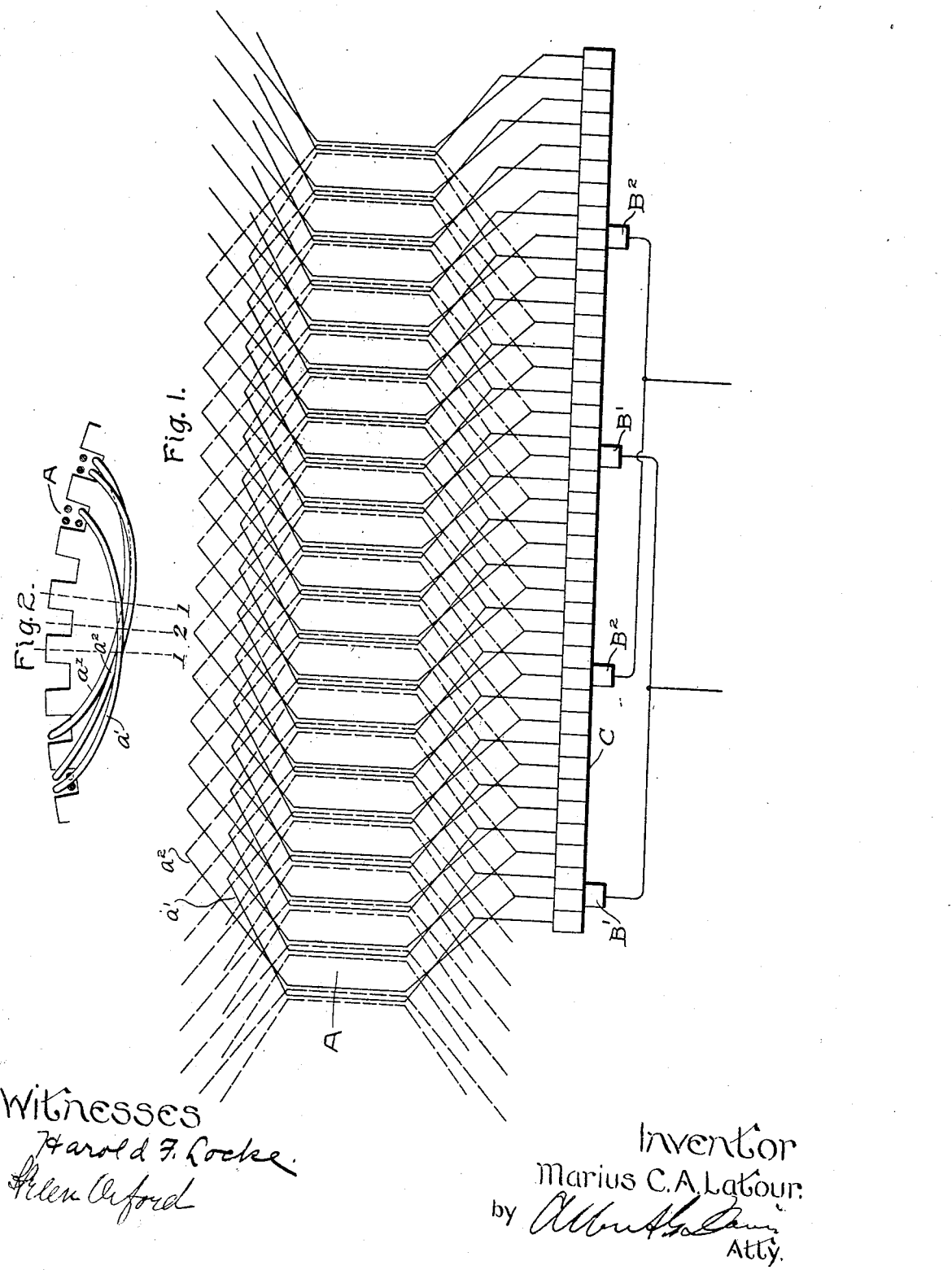

MARIUS C. A. LATOUR, OF PARIS, FRANCE, ASSIGNOR TO GENERAL ELECTRIC COMPANY, A CORPORATION OF NEW YORK.

DYNAMO-ELECTRIC MACHINE.

No. 841,543.

Specification of Letters Patent.

Patented Jan. 15, 1907.

Application filed January 21, 1905. Serial No. 242,088.

*To all whom it may concern:*

Be it known that I, MARIUS C. A. LATOUR, a citizen of France, residing at Paris, France, have invented certain new and useful Improvements in Dynamo-Electric Machines, of which the following is a specification.

My invention relates to alternating-current machines of the commutator type; and its object is to provide a novel arrangement of rotor-windings whereby the commutation is improved.

It is well understood in the art that an armature-coil in an alternating machine which is short-circuited by a brush is the seat of heavy induced currents, owing to the fluctuating field of the motor. In order to avoid these heavy short-circuit currents, it has been proposed heretofore to employ a plurality of parallel armature-windings connected to successive segments of the commutator and to employ commutator-brushes of a width insufficient to bridge two commutator-segments that are connected to the same winding. By this means all short-circuiting of the armature-coils during commutation is avoided; but the arrangements of the parallel windings which have been employed heretofore present certain disadvantages. Suppose, for instance, that it is desired to employ two parallel armature-windings instead of a single winding, each winding to be connected to alternate commutator-segments. Obviously if the induced armature voltage at the successive commutator-segments is to progress regularly in phase, as the case with the commutator-segments of an armature with a single distributed winding, the phase of the induced voltages in the several armature-coils of both windings must progress regularly in accordance with the order in which these coils are connected to the commutator-segments—that is, since each coil of one winding is connected to a segment between two segments to which adjacent coils of the second winding are connected the induced voltage in each coil of the first winding should be midway in phase between the voltages induced in the adjacent coils of the second winding. In other words, each coil of the first winding should be placed on the armature midway between the positions of the two adjacent coils of the second winding. Since the construction ordinarily employed in alternating-current motors involves a laminated slotted armature-core, it would be necessary to double the number of slots which would be employed for a single winding in order that the coils of the second winding may be disposed half-way between the adjacent coils of the first winding. Doubling the number of slots, however, is usually out of the question, since it would involve too great a number of slots and would too greatly reduce the size of the teeth between slots. Consequently the arrangement that has ordinarily been employed heretofore is to place the coils of the two windings in the same slots. With this arrangement the phase of the voltage of two coils connected to two adjacent commutator-segments is exactly the same, while between each of those segments and the one beyond there is a difference in phase of the voltages of twice the amount which would be present if the coils of both windings were distributed in uniform progression. The result is substantially the same as though with a single-coil winding the brushes were shifted back and forth every time a segment passed under them. In other words, it is impossible that the brushes should be always in the best position for commutation and sparking results.

By means of my invention an even progression of the phases of the voltages in the several coils is obtained without increasing the number of slots.

My invention in one aspect consists in arranging both windings at equal distances from the periphery of the armature-core, so that the two windings have reactances as nearly equal as possible, and in forming one winding of coils having a width differing by one slot from the width of the coils of the other winding, so that two coils of different windings which on one side lie together in the same slot on their other sides will be separated by a space equal to the distance between adjacent slots—that is, the center lines of the coils are displaced from each other by half the distance between adjacent slots, which is equivalent to shifting the coils relatively to each other by an amount equal to half the distance between slots. Consequently my arrangement gives exactly the desired progression of phase of the induced voltages in the several coils of both windings which is desired to secure most satisfactory commutation.

My invention will best be understood by reference to the accompanying drawings, in which—

Figure 1 shows diagrammatically a development of an armature provided with two parallel windings arranged in accordance with my invention, and Fig. 2 is an end view showing the relative positions of two coils belonging to different windings.

In the drawings, A represents the armature-body, which in practice comprises the usual laminated slotted core. In the slots of the core are placed two parallel windings $a'$ and $a^2$. These windings for the sake of clearness are shown in Fig. 1 as composed of coils of different lengths. The coils of each winding are arranged in a form known as a "multiple" or "lap" winding. The winding $a'$ advances five slots toward the right, then returns four slots toward the left, then again advances five slots to the right, and so on around the armature. The second winding $a^2$ is similarly arranged, but has an effective coil width differing from that of coil $a'$ by the width between adjacent slots—that is, the winding $a^2$ advances six slots toward the right, returning five slots toward the left, and again advances six slots toward the right around the armature. The coils of each winding are connected to alternate segments of the commutator C, on which bear the commutator-brushes $B'$ $B'$ and $B^2$ $B^2$, the winding shown being adapted for a four-pole machine, so that the brushes $B'$ $B'$ are of one polarity and the brushes $B^2$ $B^2$ are of the opposite polarity.

It will be seen from the drawings that each coil $a^2$ on one side lies in the same slot with a side of a coil $a'$, while on the other side it lies in the same slot with a side of the adjacent coil $a'$. Its median line 2, as shown in Fig. 2, is half-way between the median lines 1 of these coils $a'$, and consequently the phase of its induced voltage is half-way between the phases of the voltage induced in these two coils. Furthermore, it is connected to a commutator-segment between the segments to which these two coils $a'$ are connected, so that the induced voltages at the commutator-segments progress regularly around the commutator in the same manner as when a single winding is employed.

In order that the coils of the two windings may be very nearly of the same length, I prefer to arrange them in the slots in the manner shown in Fig. 2, in which the coil $a'$ of the smaller slot-pitch has its sides placed at the outer sides of the two slots in which it is contained, while the coil $a^2$ of the greater slot-pitch has its sides placed on the inner sides of the slots which contain it. With this arrangement the coils of the two windings are very nearly of the same width. The slight difference in width produces a slight difference in voltage; but with a large number of slots this difference is entirely negligible.

While my invention is limited to an even number of parallel windings, it is obvious that it is applicable to four windings as well as to two—that is, any two windings may be combined in the same slots and still may give a uniform progression of phase of induced voltage by forming one winding of coils with a slot-pitch greater or less by one slot than that of the other winding. The particular form and arrangement of each winding forms no essential part of my invention, and consequently I do not desire to limit myself to the particular arrangement of windings shown.

What I claim as new, and desire to secure by Letters Patent of the United States, is—

1. In a dynamo-electric machine of the commutator type, a slotted armature-core, and two parallel windings carried in the slots at equal distances from the periphery of the armature-core, each winding being connected to alternate commutator-segments and said windings having coil widths differing from each other by the distance between adjacent slots.

2. In a dynamo-electric machine, a slotted armature-core provided with a commutator, two armature-windings carried in said slots at equal distances from the periphery of the armature-core and differing from each other in the slot-pitch of their coils, and connections from said windings to alternate commutator-segments.

3. In a dynamo-electric machine, a slotted armature-core provided with a commutator, two armature-windings equally distant from the armature-periphery composed of coils each of which has one side lying in the same slot with a coil of the other winding and has the other side lying in a different slot from that in which lies the other side of said coil of the other winding, and connections from said windings to alternate commutator-segments.

4. In a dynamo-electric machine, a slotted armature-core provided with a commutator, two armature-windings composed of coils each of which has one side lying in the same slot as a coil of the other winding and has the other side lying in the same slot with a second coil of the other winding adjacent to the first, each coil of each winding having one side in the top and the other in the bottom of a slot, and connections from said windings to alternate commutator-segments.

5. In a dynamo-electric machine, a slotted armature-core provided with a commutator, two windings carried in the same slots at equal distances from the armature-periphery but having an effective relative phase displacement equal to half the distance between adjacent slots, and connections from said windings to alternate commutator-segments.

6. In a dynamo-electric machine, a slotted armature-core provided with a commutator; two windings carried in the same slots differing from each other in the slot-pitch of their coils, and connections from said windings to alternate commutator-segments, each coil of each winding having one side in the top and the other in the bottom of a slot and being arranged with its median line midway between the median lines of the two coils of the other winding which are connected to the segments on each side of the segment to which it is connected.

7. An alternating-current motor, comprising a slotted armature-core provided with a commutator, two parallel windings carried in the slots, each winding being connected to alternate commutator-segments and said windings having coil widths differing from each other by the distance between adjacent slots, and brushes bearing on said commutator of a width insufficient to bridge adjacent segments connected to the same winding.

8. An alternating-current motor, comprising a slotted armature-core provided with a commutator, two windings carried in the same slots but having an effective relative phase displacement equal to half the distance between adjacent slots, connections from said windings to alternate commutator-segments, and brushes bearing on said commutator of a width insufficient to bridge adjacent segments connected to the same winding.

9. In a dynamo-electric machine, a slotted armature-core provided with a commutator, two windings carried in the same slots and differing from each other by one slot in the slot-pitch of their coils, each coil of the winding of the greater slot-pitch having its opposite sides arranged at the inner sides of the slots in which it is contained and each coil of lesser slot-pitch having its opposite sides arranged at the outer sides of the slots in which it is contained.

10. In a dynamo-electric machine of the "multiple" or "lap" type, a slotted armature-core, and two parallel windings carried in the slots at equal distances from the armature-periphery, each winding being connected to alternate commutator-segments and said windings having coil widths differing from each other by the distance between adjacent slots.

11. In a dynamo-electric machine of the "multiple" or "lap" type, a slotted armature-core provided with a commutator, two windings carried in the same slots but having an effective relative phase displacement equal to half the distance between adjacent slots, each coil of each winding having one side in the top and the other in the bottom of a slot, and connections from said windings to alternate commutator-segments.

12. An alternating-current motor, comprising a slotted armature-core provided with a commutator, two windings carried in the same slots at equal distances from the periphery of the armature-core but having a relative displacement equal to half the distance between adjacent slots, connections from said windings to alternate commutator-segments, and brushes bearing on said commutator of a width insufficient to bridge adjacent segments connected to the same winding.

In witness whereof I have hereunto set my hand this 18th day of January, 1905.

MARIUS C. A. LATOUR.

Witnesses:
  BENJAMIN B. HULL,
  HELEN ORFORD.